US008534620B2

(12) United States Patent
Zierer et al.

(10) Patent No.: US 8,534,620 B2
(45) Date of Patent: Sep. 17, 2013

(54) SPREADER FOR A STAND AND SET COMPRISING THE SPREADER AND A TRIPOD

(75) Inventors: Robert Zierer, Grobenzell (DE); Jolyon Torbitt, Bury St. Edmunds (GB); Philip Christopher Dalgoutte, Bury St. Edmunds (GB)

(73) Assignee: Camera Dynamics GmbH, Eching (DE)

( * ) Notice: Subject to any disclaimer, the term of this patent is extended or adjusted under 35 U.S.C. 154(b) by 696 days.

(21) Appl. No.: 12/205,812

(22) Filed: Sep. 5, 2008

(65) Prior Publication Data

US 2009/0072100 A1    Mar. 19, 2009

(30) Foreign Application Priority Data

Sep. 7, 2007    (DE) .................... 20 2007 012 585 U

(51) Int. Cl.
*F16M 11/32* (2006.01)
*F16M 11/34* (2006.01)

(52) U.S. Cl.
USPC .................... 248/168; 248/163.1; 248/170

(58) Field of Classification Search
USPC ............... 248/169, 171, 168, 170, 434, 165, 248/166, 151, 163.1, 177.1, 188.91, 188.1, 248/188.3, 188.5, 188.6, 188.7, 440, 163.2; 16/262, 263; 211/203; 403/315–320, 324; 396/419, 428
See application file for complete search history.

(56) References Cited

U.S. PATENT DOCUMENTS

| 83,393 | A | * | 10/1868 | Maschauer et al. ............. 16/262 |
|---|---|---|---|---|
| 1,099,505 | A | * | 6/1914 | Llewellin ...................... 248/171 |
| 1,392,144 | A | * | 9/1921 | Gray ............................. 248/170 |
| 1,517,825 | A | * | 12/1924 | Bruneau ....................... 248/171 |
| 2,160,538 | A | * | 5/1939 | Cavuoti ................... 248/188.91 |
| 2,262,939 | A | * | 11/1941 | Howard ..................... 248/188.5 |
| 2,277,939 | A | * | 3/1942 | Thalhammer .............. 248/188.9 |
| 2,282,285 | A | * | 5/1942 | Olson ........................... 248/169 |
| 2,467,005 | A | * | 4/1949 | Belanoff .................. 248/188.91 |
| 4,015,806 | A | * | 4/1977 | Cattermole ................... 248/168 |
| 4,570,886 | A | * | 2/1986 | Mooney ..................... 248/186.1 |
| 5,531,438 | A | * | 7/1996 | Corley .......................... 473/429 |
| 5,769,370 | A |   | 6/1998 | Ashjaee |
| 6,438,800 | B1 | * | 8/2002 | Narang et al. .................. 16/389 |
| 7,631,842 | B2 | * | 12/2009 | Crain et al. ................. 248/176.1 |
| 2001/0010764 | A1 | * | 8/2001 | Sherwin ....................... 396/428 |
| 2006/0086869 | A1 |   | 4/2006 | Hsieh |
| 2009/0072100 | A1 |   | 3/2009 | Zierer et al. |

FOREIGN PATENT DOCUMENTS

| DE | 28 45 509 A1 | 4/1980 |
|---|---|---|
| DE | 38 05 260 A1 | 8/1989 |
| DE | 38 05 262 A1 | 8/1989 |
| DE | 20200601419 | 11/2006 |
| DE | 202007012585 U1 | 9/2007 |
| WO | WO 03008855 A | 1/2003 |

* cited by examiner

*Primary Examiner* — Terrell McKinnon
*Assistant Examiner* — Ingrid M Weinhold
(74) *Attorney, Agent, or Firm* — Wolf, Greenfield & Sacks, P.C.

(57) ABSTRACT

A spreader device and a modular stand system including the spreader device are disclosed. The spreader device is configured to detachably couple with and support a stand unit, and to function independently as a stand when detached from the stand unit. Each arm of the spreader device may detachably and rotatably couple with a leg of the stand unit. The modular stand system may also include a monopod where both the spreader device and the stand unit are configured to engage the monopod. The functionality an configurability of each component in the modular stand system may permit increased system flexibility using a small number of components.

24 Claims, 9 Drawing Sheets

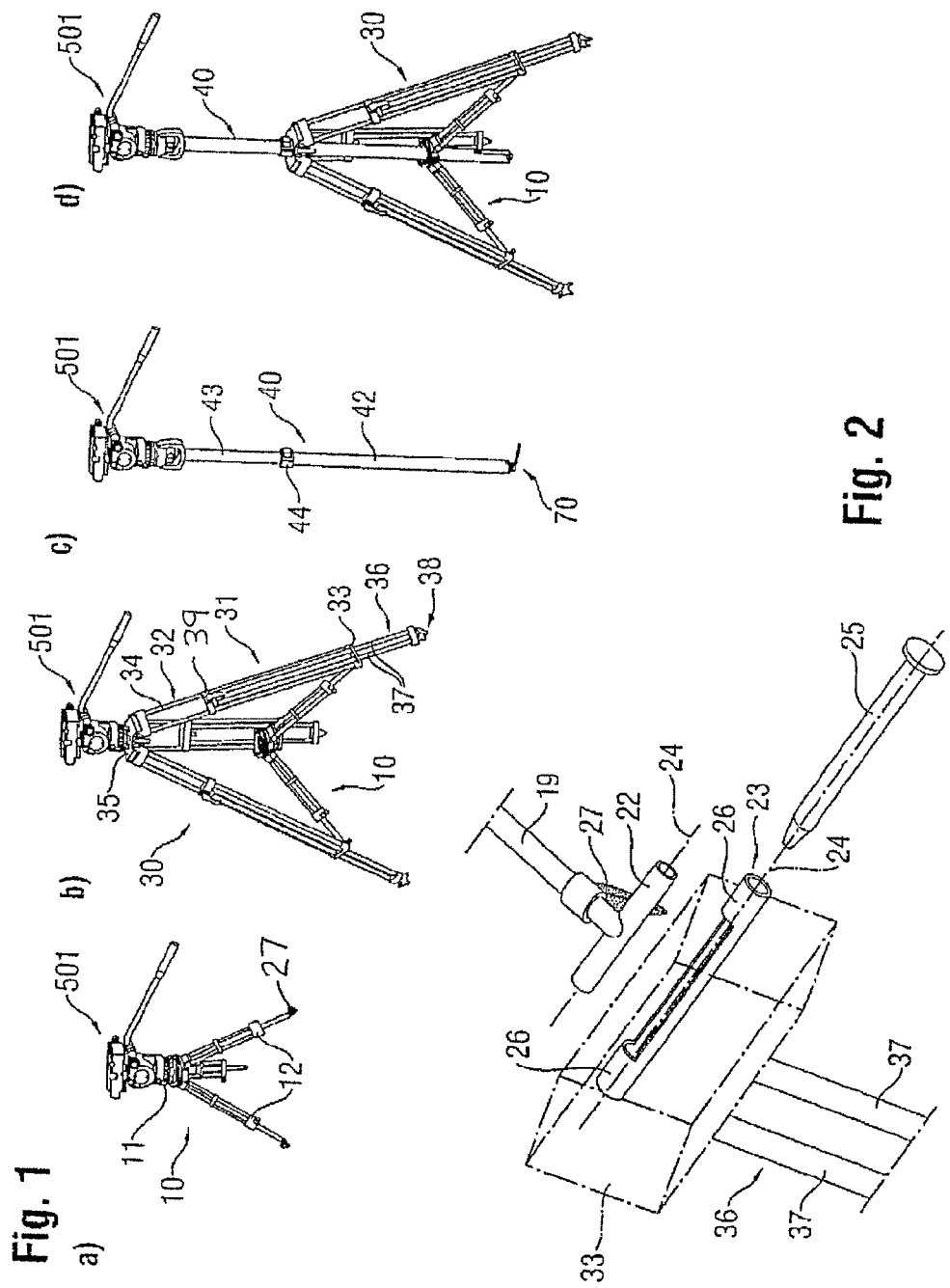

SPREADER FOR A STAND AND SET COMPRISING THE SPREADER AND A TRIPOD

CROSS REFERENCE TO RELATED APPLICATION

Foreign priority benefits are claimed under 35 U.S.C. §119 (a)-(d) of German Application No. DE 20 2007 012 585.2, filed Sep. 7, 2007, which is hereby incorporated by reference in its entirety.

BACKGROUND

1. Field of Invention

Aspects of the invention relate to a spreader for a stand, and in particular to a mid-level spreader and a multifunctional stand system including the spreader and a stand.

2. Discussion of Related Art

The use of a spreader to stabilize support legs of a tripod stand in a spread position increasing the rigidity and stability of the stand is well known. Known spreaders include floor spreaders, which connect to the stand in the region of the stand's feet, and mid-level spreaders, which are attached to the support legs in a region between the feet and a coupling piece of the stand that may accommodate a stand head. In various professional and semi-professional fields requiring a camera, such as reporting, filming extreme sports, producing documentaries, producing wedding videos, etc., a camera support is transported to the corresponding filming location and may be reconfigured to suit the location.

SUMMARY

Aspects of the invention are directed to stand systems that are easily transportable, easily assembled and flexibly configurable, as well as reasonably priced. Such systems may include modular components that can be used separately or in different combinations, possibly reducing the number of individual components required, which may reduce a cost of the system. Aspects of the invention may also or instead be directed to a multi-functional device that can function as a conventional spreader and also function as an independent stand.

According to one embodiment, a mid-level spreader for a stand with three support legs is disclosed. The mid-level spreader includes a main body and three arms, which are each mounted with their first end in an articulated manner on the main body. The arms are provided at their second end with a first locking element of a locking device that is a counterpart to a second locking element of a locking device on the respective leg for detachable connection to a corresponding support leg of the stand. The three arms are embodied as stand legs and the main body is embodied to accommodate a stand head. According to another embodiment, a set, including the mid-level spreader and the stand, is disclosed.

According to yet another embodiment, a spreader device, configured to detachably couple with a stand unit, is disclosed. The device includes a main body configured to engage a stand head. The device also includes arms configured to detachably and rotatably couple with legs of the stand unit and configured to support the device when the device is detached from the stand unit. The device also includes feet configured to contact a support surface when the spreader device is detached from the stand unit.

According to another embodiment, a modular stand system is disclosed. The system includes a stand unit having legs and a spreader unit. The spreader unit is configured to detachably couple with the legs of the stand unit to stabilize the stand unit and configured to function as a stand when detached from the stand unit Various embodiments of the present invention provide certain advantages. Not all embodiments of the invention share the same advantages and those that do may not share them under all circumstances.

Some features and advantages of embodiments of the present invention, as well as the structure of some embodiments are described in detail below.

BRIEF DESCRIPTION OF THE DRAWINGS

The accompanying drawings are not intended to be drawn to scale. In the drawings, each identical or nearly identical component is illustrated in various figures is represented by a like numeral. For purposes of clarity, not every component may be labeled in every drawing. Various embodiments of the invention will now be described, by way of example, with reference to the accompanying drawings, in which:

FIG. 1a is a perspective view of a spreader device of a modular stand system with the spreader device being used as a stand, according to one embodiment;

FIG. 1b is a perspective view of the spreader device depicted in FIG. 1a being used to stabilize a stand unit, for example a tripod, according to one embodiment;

FIG. 1c is a perspective view of a monopod of the modular stand system being used as a separate stand, according to one embodiment;

FIG. 1d is a perspective view of the spreader of FIG. 1a being used to stabilize the stand unit of FIG. 1b and the monopod of FIG. 1c being used as the center tube of the stand unit, according to one embodiment;

FIG. 2 is an exploded perspective schematic view illustrating an arm of the spreader device coupling with a support leg of the stand unit, in accordance with an embodiment of the invention;

FIG. 4a is a side view of a spreader device, according to another embodiment;

FIG. 4b is a perspective view of a top portion of the spreader device depicted in FIG. 4a;

FIG. 4c is another perspective view of a top portion of the spreader depicted in FIG. 4a;

FIG. 4d is yet another perspective view of a top portion of the spreader depicted in

FIG. 4a;

FIG. 6a is a side view of the combination depicted in FIG. 5 in a retracted state;

FIG. 6b an enlarged perspective view of a top portion of the combination depicted in FIG. 6a;

FIG. 7a is a perspective view of a monopod, according to one embodiment;

FIG. 7b is a perspective view of the monopod depicted in FIG. 7a;

FIG. 7c is an enlarged view of a bottom portion of the monopod depicted in FIGS. 7a and 7b;

DETAILED DESCRIPTION

Figure 3:
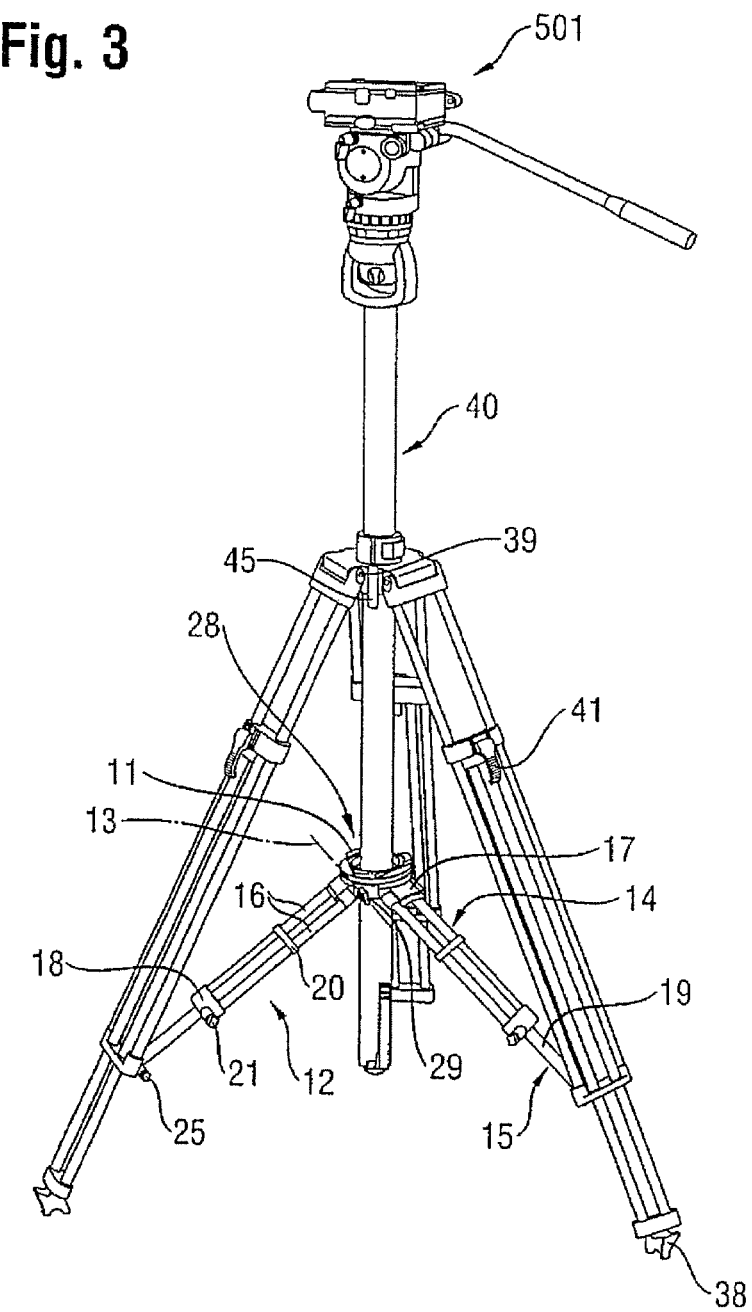
FIG. 3 is an enlarged perspective view of the stand unit, spreader device, and monopod depicted in FIG. 1d.

Aspects of the invention are directed to a multifunctional spreader device configured to function as an independent mini stand, and to function as a spreader for a larger stand unit. When functioning as an independent stand, the spreader device may be configured to accommodate a piece of equipment to be supported, for example, a camera or lamp or similar equipment. The spreader device is also configured to couple with a separate stand unit, such as a tripod, and function as a spreader to stabilize and increase the rigidity of the stand unit. Aspects of the invention are also directed to a modular system that includes the spreader device and the stand unit to which the spreader device detachably couples. The modular system may also include additional elements such as a monopod.

In some embodiments, the spreader device is a mid-level spreader configured to engage a stand unit with three or more support legs. Such as spreader device may be used with a stand unit that accommodates an imaging device or an illuminating device, such as a camera or lighting for use in the film and television industry. In one embodiment, the spreader device includes a main body and at least three arms. A first end portion of each arm may be mounted to the main body in an articulated manner. For example, each arm may be pivotable relative to the main body. As another example, each arm may be rotatable relative to the main body about an axis extending perpendicularly to a longitudinal extension axis of the arm.

In some embodiments, each arm of the spreader device may couple with a corresponding support leg of the stand unit. A second end portion of each arm may include a first locking element that detachably couples with a corresponding second locking element on a leg of the stand unit. In other words, a first locking element of each arm may engage a corresponding second locking element of a leg to couple each spreader arm with a corresponding stand leg. Each arm of the spreader device may couple or engage a corresponding leg of the stand unit in any known manner using any known technique, as the invention is not limited in this regard.

As noted above, the spreader device may function as an independent stand when detached from the stand unit. In some embodiments, the spreader device may have three or more arms that are configured to function as legs of a small stand, e.g. the spreader arms may be positionable in different alignments relative to each other in the style of a tripod resting on a surface, so that the spreader standing on the three arms forms a "mini" stand. The main body may be configured to accommodate a stand head on which a camera (e.g., television camera), light source or other equipment may be mounted.

In some embodiments, the second end portion of each arm may include a foot for stably positioning the arm on various surfaces when the spreader device is used as a stand. In one embodiment, the feet may be in the form of spikes and/or may include a non-slip material, e.g. rubber. In some embodiments, the feet may be substantially in the shape of a claw (e.g., an eagle's claw) with the aforementioned spike forming the tip of the claw. Each foot may be detachably mounted to the corresponding arm, fixedly mounted to the corresponding arm, or integral with the corresponding arm, as the invention is not limited in this respect.

In some embodiments, each foot may be detachably connected to the first locking element at the second end portion of each arm. The feet of the spreader device may be detached from the arms to facilitate coupling or connecting each spreader arm with a corresponding stand leg when the spreader device is used with a stand unit. In some embodiments, each foot may be detached from the first locking element of a spreader arm to facilitate connection of the first and second locking elements. In one embodiment, the feet can be embodied integrally with the arms or as separate parts, for example inserted in the hollow-body shaped arms (tubes). Each foot may have any known configuration and attach to the corresponding arm in any known manner, as the present invention is not limited in this respect.

Many different configurations that couple each spreader arm to a corresponding stand leg fall within the scope of the present invention. In some embodiments, the first or the second locking element for connecting the arms of the spreader device to the respective support legs of the stand unit may include a hollow cylindrical body, and the corresponding other locking element may also include a hollow cylindrical body. The cylindrical body of either the first or the second locking element may include a recess configured such that the cylindrical body of the corresponding other locking element can be accommodated in the recess. For example, in some embodiments, the recess may extend along at least half the length of the cylindrical body. In some embodiments, the recess does not extend into the end regions of the hollow cylindrical body so that ring-shaped ends are formed at each end portion of the body. In the portion of the cylindrical body that is recessed, a shell is formed with a cross-section that is at most semicircular. To couple the locking elements, the first or second locking element is inserted in the recess of the corresponding other locking element such that the hollow cylinders are generally aligned. Inserting a locking pin through the ring-shaped end portion of one cylindrical locking element and through the cylindrical body of the other locking element couples an arm of the spreader device to a respective support leg of the stand unit. Although each arm is locked to a leg, each arm is free to pivot with respect to the leg, about the center axis of the hollow cylindrical locking elements with the pin as a pivot axis.

In other embodiments, the recess may extend entirely through the hollow cylindrical body of the second locking element dividing the second locking element into two co-axial cylinders. In some embodiments, a shoulder may be formed in each co-axial cylinder at each end of the recess. The first locking element may include a channel that extends through a foot of the spreader device. The first locking element may also include ring-shaped collars on each end of the channel where the channel emerges from the foot. The claw shaped foot may be positioned such that the collars of the first locking element engage the shoulders of the second cylindrical locking element and an axis of the channel of the first locking element is substantially in the same location as an axis of the second cylindrical locking element. The first locking element and the second locking element may be connected using a locking pin, such as a bolt or pin that is part of the second or first locking element and that may be biased to move in a locking direction by a spring. The locking pin may include a handle at one end for moving the pin out of the locking position against the force of the spring, and hence out of engagement with the first or second locking element.

In some embodiments, the main body of the spreader may include a central channel or hole sized and shaped to accommodate a monopod. The monopod may include a telescopic tube having a circular cross-section that is accommodated by a circular hole in the main body. A clamping device may be used to fix the monopod in the accommodating hole, locking the monopod to the main body of the spreader device and may be used to clamp the motion of the monopod relative to the main body. In some embodiments, the clamping device includes a bolt having a handle at one end portion and a thread at an opposite end portion. The clamping device may also include a translationally displaceable brake/locking shoe. The thread of the end portion of the bolt may be configured to engage an inside thread of the shoe such that when the bolt is turned using the handle, the shoe presses radially inward against the inserted tube of the monopod, thereby braking motion of the monopod or locking the tube of the monopod relative to the main body.

In other embodiments, the clamping device may include a cam that may be directly or indirectly actuated using a handle. In a locked position, the cam presses radially inward on an outside surface of the tube of the monopod to lock the monopod relative to the main body. In some embodiments, the cam is integral with an axially pivotable lever that is attached to the main body.

According to one embodiment of the present invention, the main body includes a fastening arrangement for a stand head. The fastening arrangement may be a nut-type component having an inside thread configured to engage a threaded bolt of the stand head. The nut-type component may be inserted in the hole or channel of the main body, and be held temporarily and detachably held in the accommodating hole by latching hooks distributed around a circumference of the accommodating hole.

In some embodiments, the arms of the spreader device may be telescopically lockable. Each arm may include a first arm stage having parallel limbs that are connected via a guide element, and a second arm stage having at least one limb that is guided and held in the guide element. The spreader device may have arms whose length can be changed telescopically by moving one of the arm stages relative to the other arm stage. A clamping device may be provided to lock prevent the first arm stage and second arm stage from sliding relative to one another to maintain a length of the arm. In some embodiments the clamping device for clamping the second arm stage is provided on the guide element. As with the aforementioned clamping device for clamping the monopod, the clamping device for clamping the second arm stage can be a cam actuatable by a handle, which in the locked position presses radially inward on the outside surface of a limb in order to lock it. In some embodiments, the clamping device may include a screw or bolt (e.g. a knurled screw), engaging a threaded hole, pressing radially inward on the outside surface of the limb to lock the relative positions of the limbs. As is clear to one of skill in the art, a similar mechanism may be used to lock the monopod. Any known mechanism may be used to secure the monopod in the main body and/or to secure relative positions of the arm stages, as the invention is not limited in this respect.

Some embodiments may also include additional features to guide the translation of the first arm stage relative to the second arm stage and/or to provide further support and stability the arm stages. An end portion of the limb of the second arm stage, which is directed toward the first arm stage, may be positioned between and supported by the parallel limbs of the first arm stage. In some embodiments, the limb of the second arm stage may include an additional guide element, for example a plate, that partially or completely encircles the two limbs of the first arm stage, thereby slidably coupling the limb of second arm stage with the two limbs of the first arm stage and guiding an end portion of the limb of the second arm stage.

Other embodiments provide a set or a multifunctional system including a spreader device and a stand unit, for example a tripod. The spreader device can be coupled to the stand unit to function as a spreader for the stand unit, and the spreader can function as an independent stand when detached from the stand unit. In some embodiments, the multifunctional system may also include a monopod that couples with the stand unit, the spreader device or both. The three or more legs of the stand unit may be attached in an articulated manner to a coupling piece of the stand unit. The monopod may be inserted through an opening in the coupling piece of the stand unit, and into the accommodating hole of the spreader. The monopod may be fixed to the spreader by a clamping device or in any other manner. Including a monopod in the modular system increases the functionality of the system. As described above the spreader device can be used either as a spreader to stabilize and increase the rigidity of the stand unit or as an independent stand. Similarly, the monopod can be used independently, the monopod can be coupled with the stand unit, or the monopod can be coupled with both the stand unit and spreader device to create a stabilized stand with a center pole that can telescopically extend.

In some embodiments, it may be preferable for the monopod to include a telescopic tube, i.e. to be telescopically extendable. In this embodiment, the monopod may comprise a clamping device for fixing relative positions of partial tubes that form the telescopic tube. In some embodiments, the clamping device may include a conical ring (inner ring), onto which another ring (outer ring) having a mating cone is screwed, thereby pressing the conical inner ring radially against a partial tube of the monopod). Firmly tightening the outer ring with its mating cone causes the inner cone to press the inner ring against the inner tube and fixes the relative position of the tubes that form the telescopic tube. In other embodiments, the telescopic tube clamping device may have a cam/lever configuration or screw configuration similar to those described above.

In some embodiments, the coupling piece of the stand unit includes a clamping device for fixing the monopod, and for stabilizing the combination of the monopod, the spreader device and the stand unit. As is clear to one of skill in the art, a cam actuatable by a handle may be employed to clamp the monopod to the spreader device and/or to the stand unit. Actuating the handle of such a clamping device would cause the cam to presses radially inward on the outside surface of the monopod tube.

In some embodiments, it may be preferable for the support legs of the stand unit to be telescopic. Various types, methods and structures for telescopic legs are known, and these or other suitable arrangements could be employed in embodiments of the invention.

Embodiments of the invention provide a multifunctional spreader device that can be used both as a spreader for the stabilization of a stand unit, such as a tripod, and also as an independent stand. Embodiments of the invention also provide a flexible modular stand system including the spreader device, the stand unit and optionally a monopod. The system can be used in a very wide variety of ways and the components can be used both separately and in various different combinations. Due to the multi-functionality of components in the modular system, in one embodiment, the system may include a relatively small number of components, which may allow the system to be transported relatively easily and efficiently without requiring complex procedures for assembly, dismantling or configuring the system.

Turning now to the figures, and in particular to FIGS. 1-3, a spreader device 10, in accordance with one embodiment will now be described. Spreader device 10 includes a main body 11 and three or more arms 12 connected with the main body 11 in an articulated manner. Each arm 12 may be attached to the main body 11 such that arm 12 may be pivoted about a pivot axis 13 that is oriented substantially perpendicular to an axis of longitudinal extension of arm 12. Although each arm 12 has a corresponding pivot axis 13, for simplicity, only one pivot axis 13 is shown. In the depicted embodiment, each arm 12 includes a first arm stage 14 and a second arm stage 15. First arm stage 14 may be formed from two parallel limbs 16, such as two parallel poles or tubes, as shown. In some embodiments, limbs 16 of first arm stage 14 may each have a circular cross-section. Limbs 16 may be connected to each other by a connecting element 17, which in turn is attached to the main body 11 in articulated manner so it may be pivoted about axis 13. The other end portions of limbs 16 may be connected to each other by a guide element 18. In some embodiments, guide element 18 may include a through opening (not shown) through which a limb 19 of the second arm stage 15 passes, thereby guiding limb 19 of the second arm stage 15. In some embodiments, limb 19 may be a rod or tube with a circular cross-section. Some embodiments may also include an additional guide element at an end portion of limb 19 directed toward the main body 11. For example, an additional guide element may include a plate 20 fastened to an end portion of the limb 19, as shown. Plate 20 partially encircles limbs 16 of first arm stage 14 on both sides of limb 19, thereby supporting opposite sides of limb 19 of second arm stage 15 with limbs 16 of first arm stage 14. In some embodiments, guide element 18 may include a clamping device 21 (in the region of the through opening), such as a manually actuated screw or bolt, for fixing a position of limb 19 with respect to guide element 18 and limbs 16. Tightening a screw of clamping device 21 causes the screw to move radially inward toward limb 19 and either presses on an outside surface of the limb 19 in such a way that it is fixed, or moves a translationally displaceable shoe that presses on an outside surface of the limb 19.

In one embodiment, an end portion of limb 19 opposite plate 20 may include a first locking element 22, as depicted in FIG. 2. It should be appreciated that limb 19 may be a hollow tube configured to accommodate an additional extension limb that may be nested in limb 19 and that can be telescopically displaced and locked to effectively change a length of the second arm stage 15.

The second end portion of limb 19 may include a locking element, an optional extension limb, an integral foot and/or a detachable foot. First locking element 22 may be fastened to a second end portion of limb 19 or may be fastened to an end portion of an optional extension limb. The second end portion of limb 19 may also include a foot that is used when the spreader device 10 functions as a stand. For example, the embodiment depicted in FIG. 1*a* and FIG. 2 includes an integral rubber spike-like foot 27. Some embodiments may include a foot with a flat contact surface that may be made of rubber, and that may be detachably connected with the first locking element 22. A flat foot or other configuration of foot may be configured to lock to a support leg 31 of the stand unit in the same manner that first locking element 22 locks to the support leg 31, which is described below.

Figure 5:
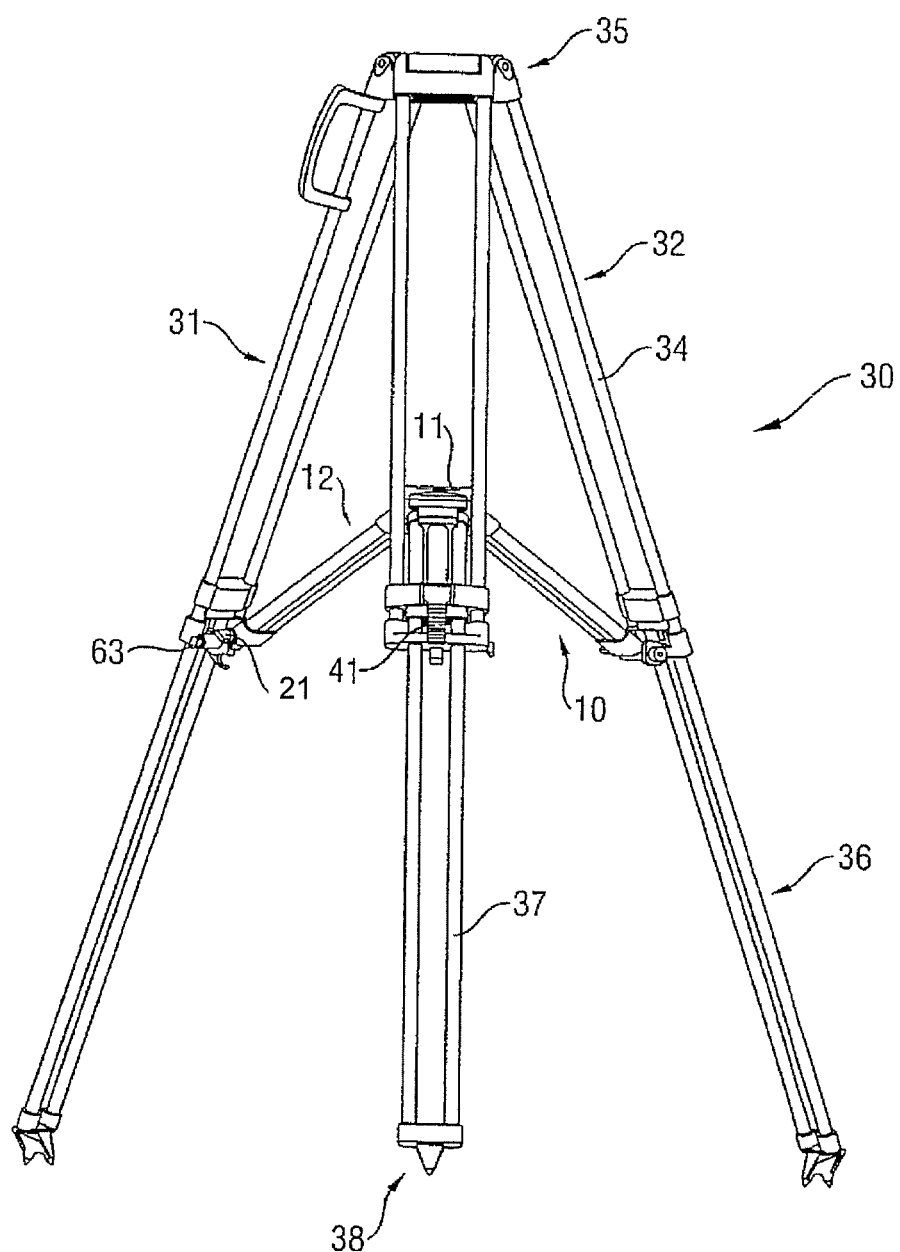
FIG. 5 is a side view of a combination of the spreader device and a stand unit, in accordance with aspects of an embodiment.

As depicted in FIG. 2, in one embodiment, the stand unit 30 may include a second locking element 23 attached to a connecting piece 33 of the first leg stage of a respective support leg 31 of the stand unit 30. Stand legs 31 may be configured similar to spreader arms 12. For example, the first leg stage of each stand leg 31 may include two parallel limbs 34 that are connected via connecting piece 33 and via a coupling piece 35 (see FIG. 1*b*), which accommodates a stand head (see below) for the stand unit 30. A second leg stage 36 of stand unit 30 may include two limbs 37, as opposed to the one limb 19 of second arm stage 14 in the depicted embodiment. Limbs 37 of second leg stage 36 are guided by a guide element, in a similar fashion as limb 19 of arm 12 is guided by guide element 18. In some embodiments, an additional guide element 39 is connected to limbs 37 of the second leg stage 36 in a similar fashion as plate 20 is connected to limb 19 of second arm stage 15. However, as depicted, additional guide element 39 completely encircles limbs 34 of first leg stage 32 (see also FIG. 5). In some embodiments, the connecting piece 33 is locked using a lever 41 connected with a cam. When in a locked position, lever 41 presses radially inward directly or indirectly on the limbs 37 of second leg stage 36 to fix a relative position of first leg stage 32 with respect to second leg stage 36. In some embodiments, stand unit 30 may be configured similar to the spreader device 10 by having only one limb in second leg stage 36, or the spreader device 10 may be configured similar to the stand unit 30 by having two limbs in second arm stage 15. It should be appreciated that other configurations of the telescopic legs, and the locking and clamping mechanisms for fixing the relative positions of individual stages, may be employed, as the invention is not limited in this respect.

In some embodiments, first locking element 22 and second locking element 23 may be embodied as hollow cylinders. In the embodiment depicted in FIG. 2, first locking element 22 includes a hollow cylindrical body with a length measured along its central axis 24. Second locking element 23 is also embodied as a hollow cylindrical body having a length, measured along its central axis, that is greater than that of the first locking element 22. A recess or hole is disposed between opposing ends of the cylindrical body of second locking element 23. The recess has a length that is greater than or equal to the length of the first locking element 22 so that the recess of the second locking element 23 is configured to receive the cylindrical body of first locking element 22. The recess may be configured such that the cylindrical body of second locking element 23 has, at most, a semicircular cross-section in a region of the recess, such that when locking element 22 is inserted in the recess, the cylindrical body of first locking element 22 and the cylindrical body of second locking element 23 substantially form a complete hollow cylinder. To ensure that first locking element 22 is retained within the recess of second locking element 23, a locking pin 25 may be introduced into ends 26 and in the direction of axis 24 of first locking element 22 and second locking element 23 thereby connecting locking elements 22 and 23. In FIG. 2 connecting piece 33 is shown with a dashed line to show the coupling of first locking element 22 and second locking element 23. In one embodiment, however, locking element 23 is outside the illustrated dashed line of connecting piece 33.

Figure 4:
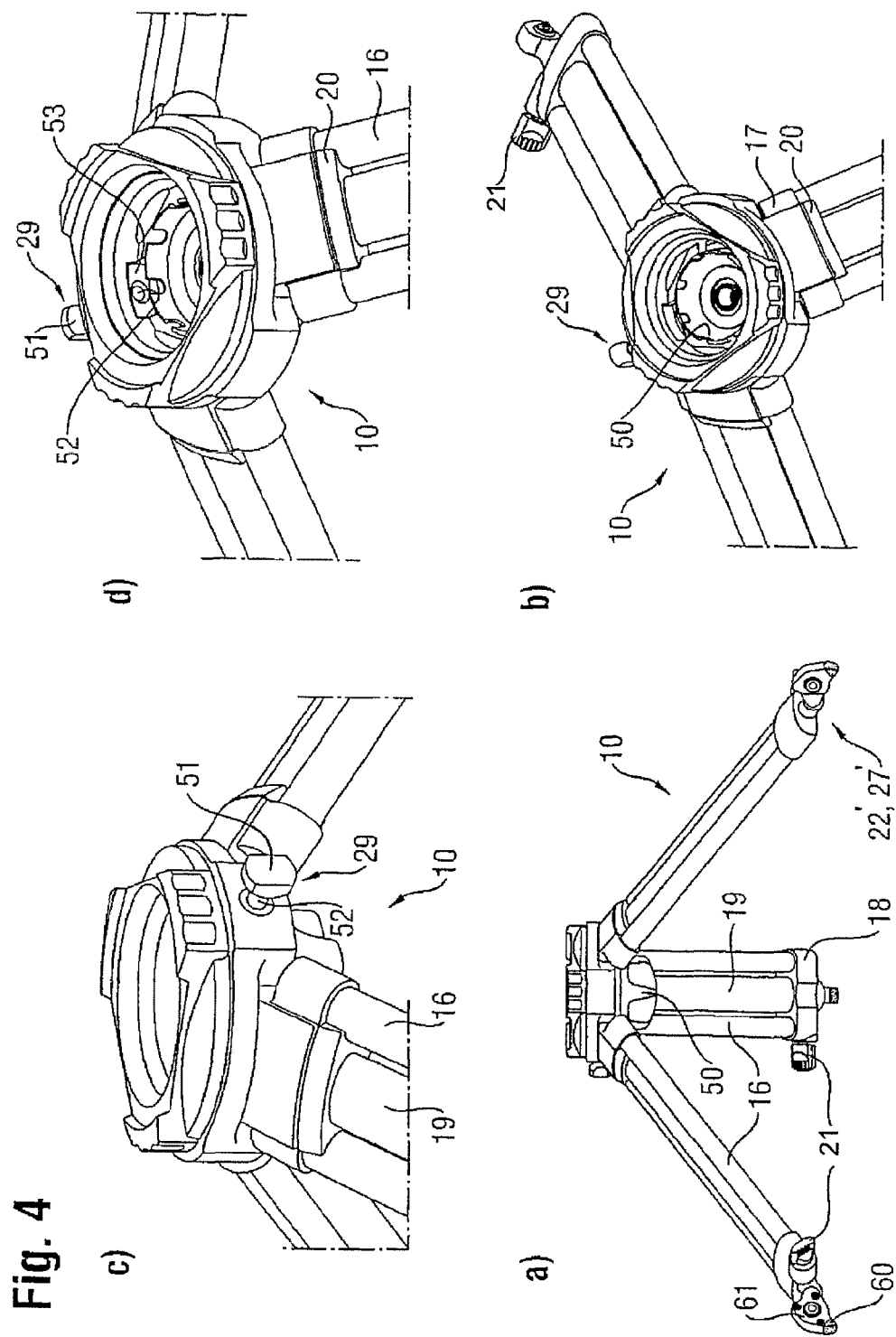

In some embodiments, main body 11 of spreader unit 10 may include an accommodating hole or channel 28 for monopod 40 as shown in FIG. 3. Monopod 40 may include one or more tubes 42, 43. The accommodating hole or channel 28 may have a circular cross-section or may have some other cross-sectional shape that is configured to receive a tube of monopod 40. Further details of the structure of monopod 40 are described below with respect to FIG. 4. As shown in FIG. 3, main body 11 may also include a clamping device 29 to secure or lock a position of monopod 40 relative to spreader unit 10. Clamping device 29 may be in the form of a manually actuatable screw or bolt 29, which when tightened, moves the screw toward a tube of monopod 40 and presses radially inward against an outside surface of the tube, thereby fixing a position of the tube of monopod 40 relative to main body 11. In other embodiments, the tube of monopod 40 may be locked to the main body 11 using a clamping-type mechanism, for example, a lever-cam mechanism. A lever-cam mechanism may be used in clamping device 21 to fix relative positions of first arm stage limbs 16 and second arm stage limb 19. Another embodiment of the clamping mechanism is discussed below with reference to FIG. 4.

Main body 11 of spreader device 10 may be configured to accommodate a stand head 501 for mounting equipment, for example a camera. In some embodiments, a fastening arrangement 50 couples main body 11 and stand head 501 as is described below with reference to FIG. 8.

As described above, in some embodiments, stand unit 30 includes three support legs 31 each with two leg stages 32 and 36, wherein first leg stage 32 or its limbs 34 are connected to coupling piece 35 of stand unit 30. Coupling piece 35 may enable leg 31 to be pivoted about a pivot axis that extends substantially perpendicularly to a longitudinal axis of leg 31 (and lever 41). At an end opposite that of the coupling piece 35, a leg 31 may include a foot 38, and foot 38 may have the form of a spike. As described above, each foot 38 may be detachably or fixedly connected to leg 31. In some embodiments, each leg 31 may be configured to couple with detachable feet configured for flat standing surface (not shown). The feet may include a non-slip surface, such as rubber feet. The feet for a flat surface may replace the detachable spike feet, or the feet for a flat surface may be attached to stand unit 30 while the spikes feet remain on the stand unit 30.

As described above, monopod 40 may include a tube. In the embodiment shown in FIG. 1c, monopod 40 includes a telescopic tube having an outer tube 42 and an inner tube 43 that are displaceable relative to each other. To fix the relative position of tubes 42 and 43, an end portion of tube 42 that faces a standing surface includes an external thread configured to engage inner threads on an outer ring 44. Outer ring 44 comprises an inner cone that presses on a mating cone of an inner ring (not shown) when the outer ring 44 is screwed onto the thread of tube 42. When outer ring 44 is tightened, the inner ring presses radially on inner tube 43, thereby fixing a position of inner tube 43 relative to outer tube 42. Coupling piece 35 of stand unit 30 may also include an opening or channel that permits the introduction of the monopod 40 or the tube 42 of the monopod 40 into or though coupling piece 35. Coupling piece 35 may also include a fastening arrangement 50, which is discussed below.

A clamping mechanism 45 may be used to fix monopod tube 42 in coupling piece 35. Clamping mechanism 45 may include a cam and a lever that actuates the cam. The cam may be embodied integral with or separate from the lever. When in a locked position, the lever presses radially inward against the outside surface of the tube 42 to fix the tube in the coupling piece 35.

In some embodiments, main body 11 of spreader unit 10 may be configured to accommodate a 75 mm fluid head. In other embodiments, coupling piece 35 of stand unit 30 may be configured to accommodate a 100 mm fluid head, as well as accommodating monopod 40. It should be appreciated that other types of stand heads may be accommodated via adapters, other fastening arrangements 50 or any other mechanism known in the art.

In some embodiments, the modular system includes spreader device 10 and stand unit 30. Such a system enables use of spreader device 10 separately as an independent stand, for example by fastening a stand head 501 on main body 11, and enables use of spreader 10 to stabilize stand unit 30, for example by connecting spreader device 10 and stand unit 30 via locking elements 22 and 23 and pin 25.

In some embodiments, the modular system also includes monopod 40, which can be used separately, in combination with the stand unit 30, or in combination with the stand unit 30 and the spreader 10. As shown in FIG. 1c, a stand head 501 may be connected to monopod 40, optionally via a fastening arrangement 50, and used without stand unit 30 or spreader 10. In FIG. 1d, monopod 40 is connected with stand head 501 and used with a combination of stand device 30 and spreader unit 10, forming a stand with extendable center posts.

As described above, a modular system comprising stand device 30, spreader unit 10, and optionally monopod 40 can be flexibly configured to be used in diverse ways. The modular nature and design of the system may permit a high level of flexibility and configurability with relatively simple assembly procedures.

For example, in the embodiment depicted in FIGS. 1a through 3, if spreader device 10 is used as a stand, a user may simply mount stand head 501 on main body 11 of spreader device 10. If spreader device 10 is used to stabilize stand unit 30, each spreader device arm 12 is locked to a stand unit support leg 31 using the locking elements 22, 23 and pin 25. A stand head 501 may then be placed on coupling piece 35 of stand unit 30. If monopod 40 is used without spreader device 10 and without stand unit 30, monopod 40 may simply be connected to stand head 501. If the combination of spreader device 10, stand unit 30, and monopod 40 shown in FIG. 1d is used, spreader device 10 is coupled to stand unit 30, and outer tube 42 is introduced through the opening or channel in coupling piece 35 of stand unit 30 and guided through accommodating hole 28 of main body 11 of spreader device 10. Before insertion of monopod 40 fastening arrangements 50 may be removed. The combination of spreader device 10, stand unit 30 and monopod 40 may be adjust such that legs 31 of stand unit 30 are positioned on the standing surface, then legs 31 of stand unit 30 and/or arms 12 of spreader device 10 are fixed, and monopod 40 is clamped via clamps 29 and 45.

Embodiments of the modular system may require only simple assembly procedures that permit fast assembly and reconfiguration as well as flexible usage. In one embodiment, the modular system may include relatively few parts or units that may be transported easily and efficiently. For this, it may be advantageous for the modular system to be transportable as a set in a common bag or other storage container.

Another embodiment of a spreader device is depicted in FIGS. 4a to 4d. One way in which the spreader device of FIGS. 4a-4d differs from the spreader device depicted in FIG. 1a is that the spreader device of FIGS. 4a-4d employs a different configuration for locking spreader arms 12 with stand legs 31. FIGS. 4a to 4d also illustrate a clamping device 21 for clamping first arm stage 14 and the second arm stage 15 in more detail.

The embodiments of the spreader unit depicted in FIGS. 4a to 4d also employ a different configuration for a locking device 29 that clamps monopod 40 to the spreader unit. For example, locking device 29 includes a rotatably mounted bolt 52 having a handle 51 and a threaded portion at an end of the bolt 52 opposite the handle 51, as shown in FIG. 4a. The bolt thread engages an inside thread of a shoe 53, as depicted in FIG. 4d. Rotating bolt 52 by handle 51 causes shoe 53 to advance radially inward toward a tube of monopod 40, thereby clamping the tube. The system may be configured to allow only a specified maximum number of revolutions of bolt 52, such as a quarter turn or a half turn, to prevent excessive clamping.

In some embodiments, a fastening device 50 similar to that used to couple monopod 40 with main body 11, is used to mount the stand head to spreader device 10. The stand head is placed on top of main body 11 such that a threaded screw of the stand head (not shown) protrudes through accommodating hole 28 of main body 11. The threaded screw engages an inside thread 54 of the fastening device 50, which consequently functions as a nut and is tightened using the handle region 55 to fix the stand head 501.

Figure 8:
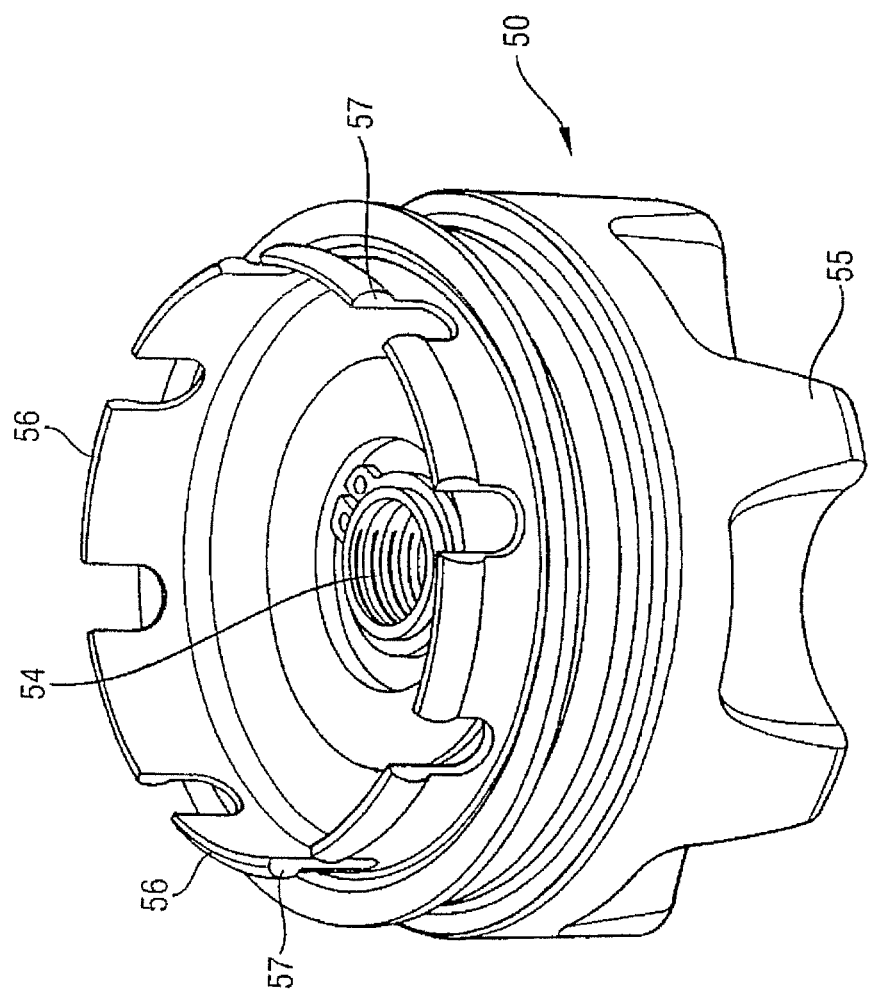
FIG. 8 is a perspective view of a fastening arrangement for fastening a stand head to the spreader device, the stand unit or the monopod, according to an embodiment.

As shown in FIG. 8, in some embodiments, fastening device 50 may include ribs 56 distributed over a circumference of fastening device 50. Ribs 56 are interrupted by recesses and comprise outwardly protruding lugs 57. Ribs 56 form latching hooks for temporarily holding fastening device 50 in accommodating hole 28 by engaging a collar around the internal circumference of the accommodating hole 28 (see also FIGS. 4*a*-4*d*).

Figure 9:
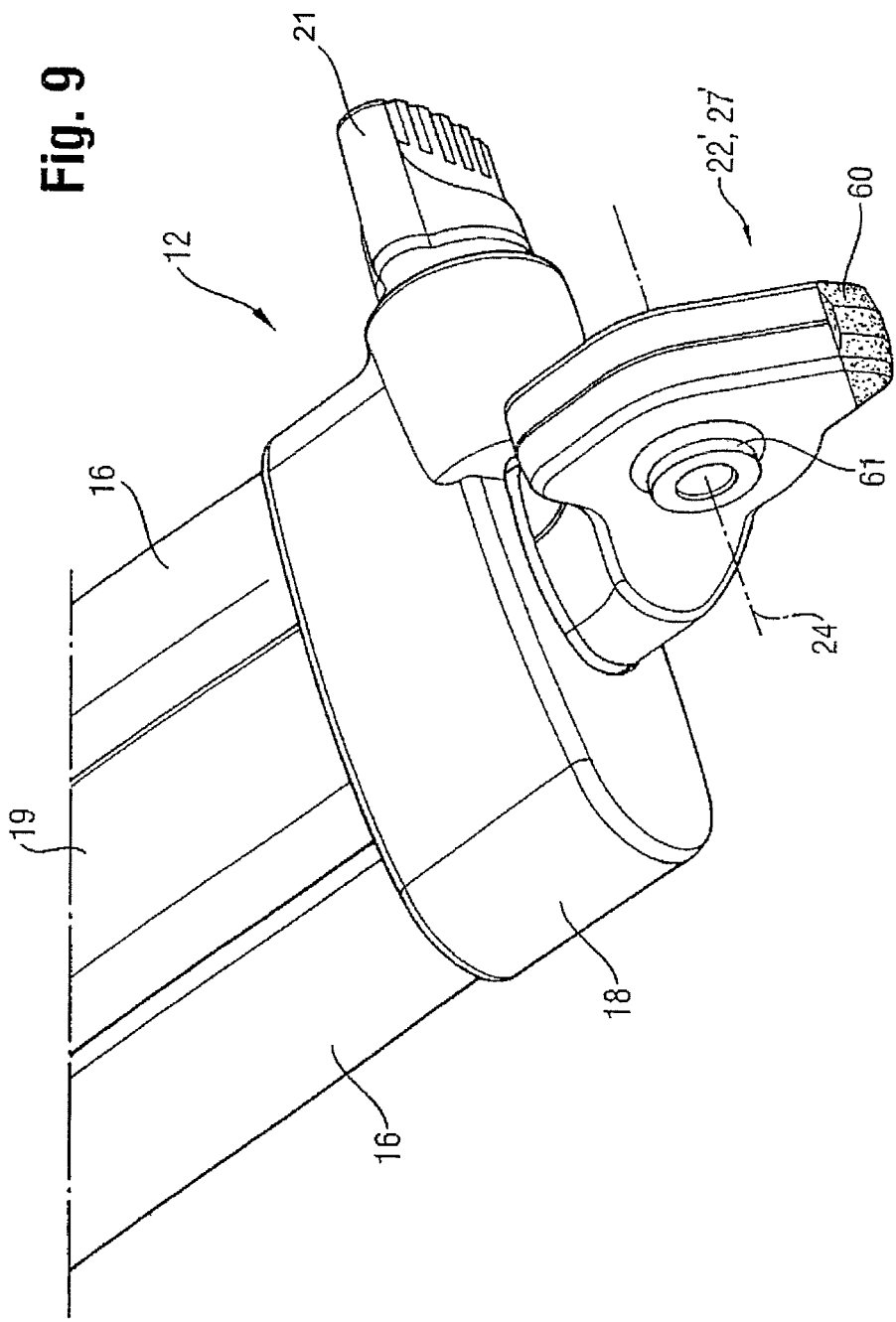
FIG. 9 is an enlarged view of a first locking element at an end portion of an arm of the spreader device shown in FIG. 4.

As mentioned above, spreader device 10 depicted in FIG. 4 differs from the spreader device depicted in FIGS. 1*a* and 2 by employing a different configuration for locking a spreader arm 12 to a stand leg 31. The configuration is described below with reference to FIGS. 4*a*, 4*b* and 9. A first locking element 22' is attached to an end portion of limb 19 facing away first arm stage 14. Extending from the end portion of limb 19 is a claw-shaped foot 27' having a tip formed from a spike-like rubber part 60. Integrated in the foot 27' is first locking element 22'. First locking element 22' is formed from a hollow cylindrical channel that extends through foot 27'. The hollow cylindrical channel includes a collar 61 disposed at each end on lateral sides of foot 27'. In some embodiments, collars 61 may be formed by inserting a hollow cylinder through a hole in foot 27' with a length such that the cylinder protrudes a certain distance from the lateral surfaces of the foot, thereby forming a collar 61 on each end of the channel.

Figure 6:
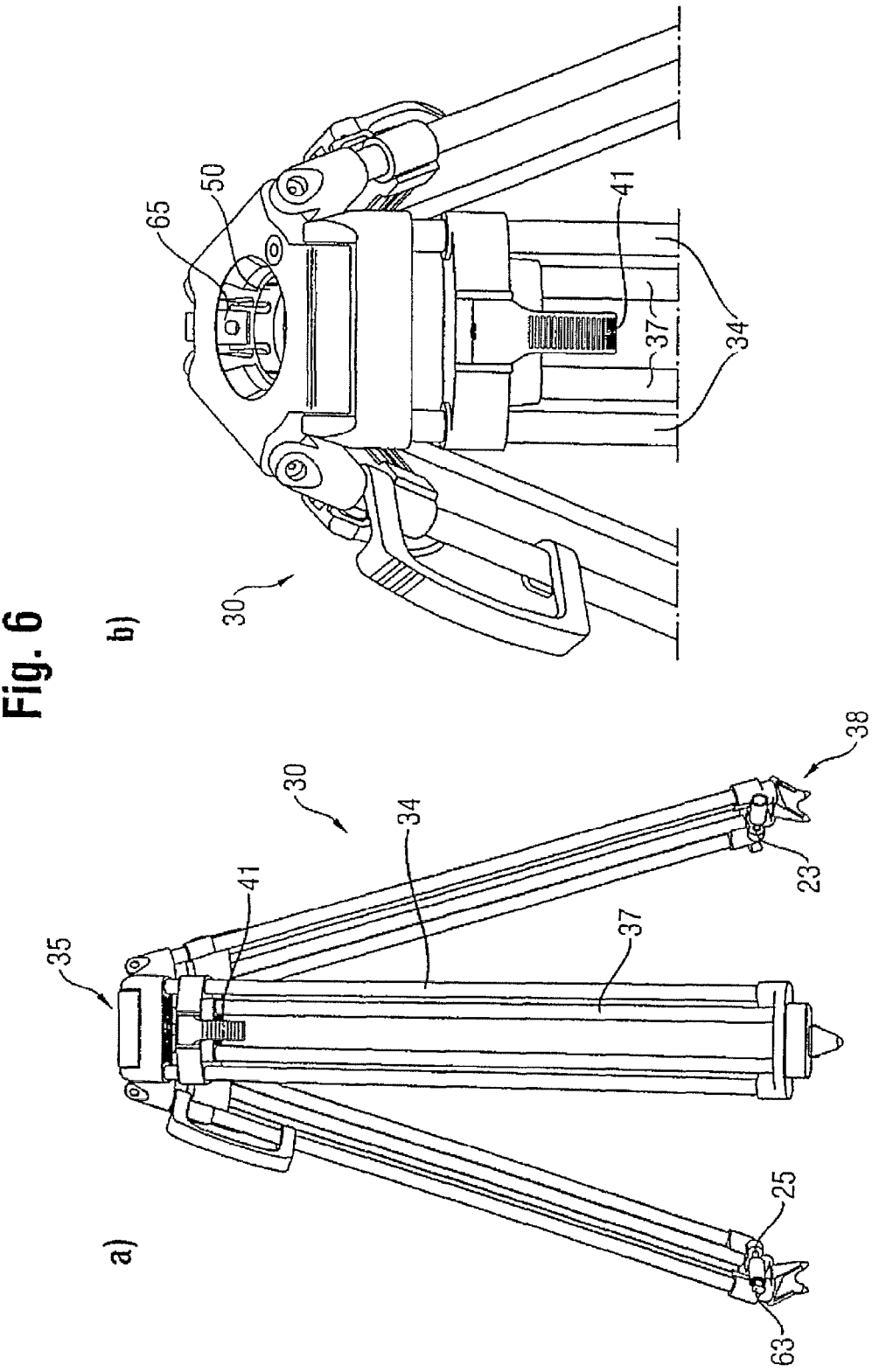
Figure 10:
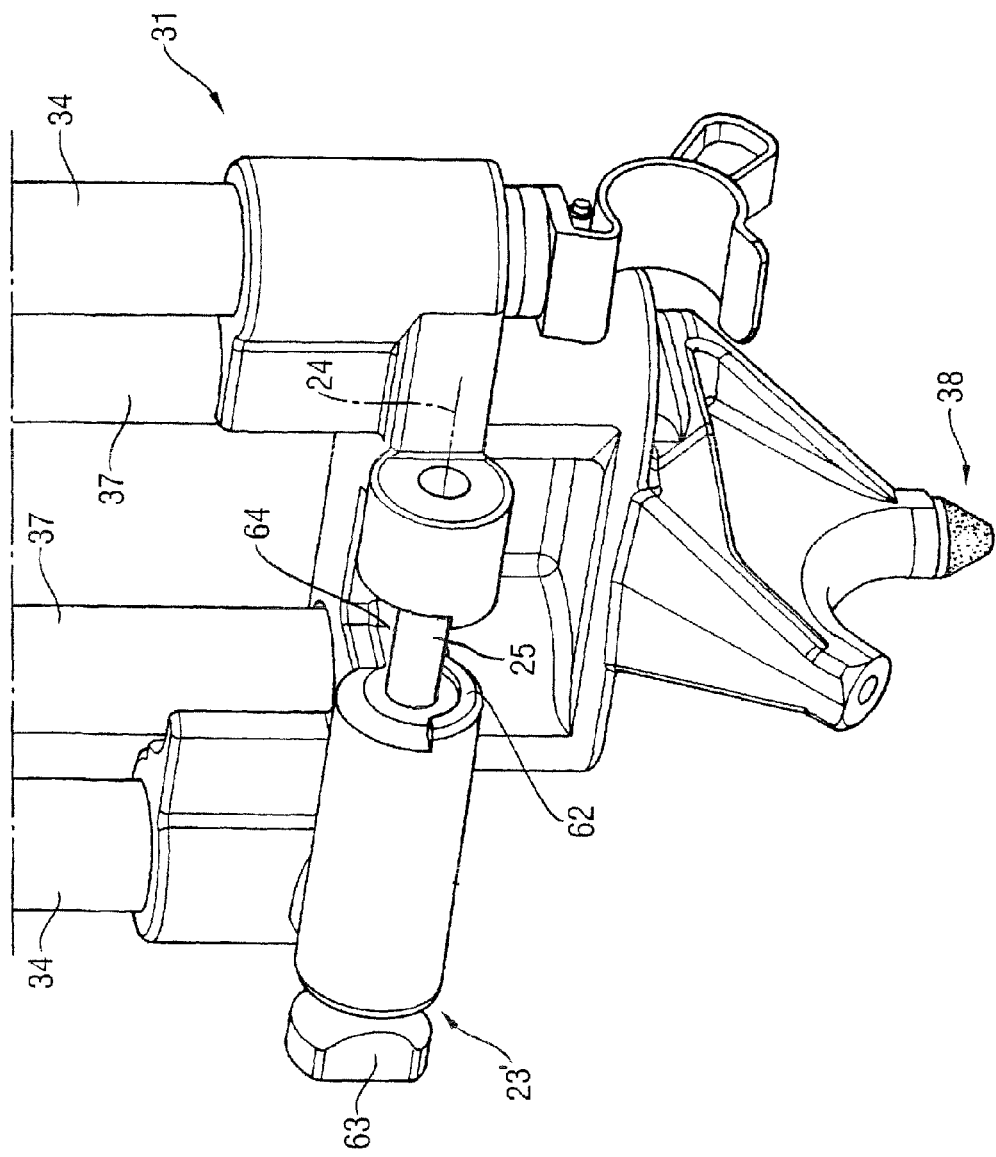
FIG. 10 is an enlarged perspective view of the second locking element of the stand unit.

The spreader device 10 depicted in FIGS. 4*a*-4*d* and FIG. 9 may be connected with the stand unit 30 depicted in FIG. 6 by coupling first locking element 22' of spreader device 10 with second locking element 23' of stand unit 30. As shown in FIG. 10, second locking element 23' includes a hollow cylindrical body with a recess that extends completely through the cylindrical body dividing the cylindrical body into two co-axial portions. An axial length of the recess is sufficiently long to accommodate an axial distance between faces of collars 61 of first locking element 22'. In some embodiments, semicircular or half-ring-shaped shoulder sections 62 are provided at both ends of the recess to engage collars 61 of first locking element 23'. A pin 25 secures locking element 22' to second locking element 23'. Pin 25 may be pre-stressed by a spring to maintain pin 25 in a locked position (not shown). Pin 25 may connected to a handle 63 used to pull pin 25 out of recess 64 against the spring resilience.

When foot 27' of spreader arm 12, is inserted in recess 64, collars 61 of first locking element 22' engage shoulders 62 of recess 64. Before inserting foot 27', handle 63 is used to pull pin 25 out of recess 64 against the spring resilience. After insertion of foot 27', handle 63 is released and pin 25 moves axially 24 due to the spring resilience to penetrate the channel of first locking element 22' and the hollow cylindrical sections of the second locking element 23' to coupled spreader arm 12 to stand arm 31.

Stand 30 may be configured to receive and mount a stand head using a fastening arrangement similar to fastening arrangement 50 that is depicted in FIG. 8. Although a fastening arrangement for stand unit 30 may differ in size (diameter) from a fastening arrangement for a spreader device; configurations for fastening arrangements for a spreader device may also be employed as fastening arrangements for a stand unit.

Figure 7:
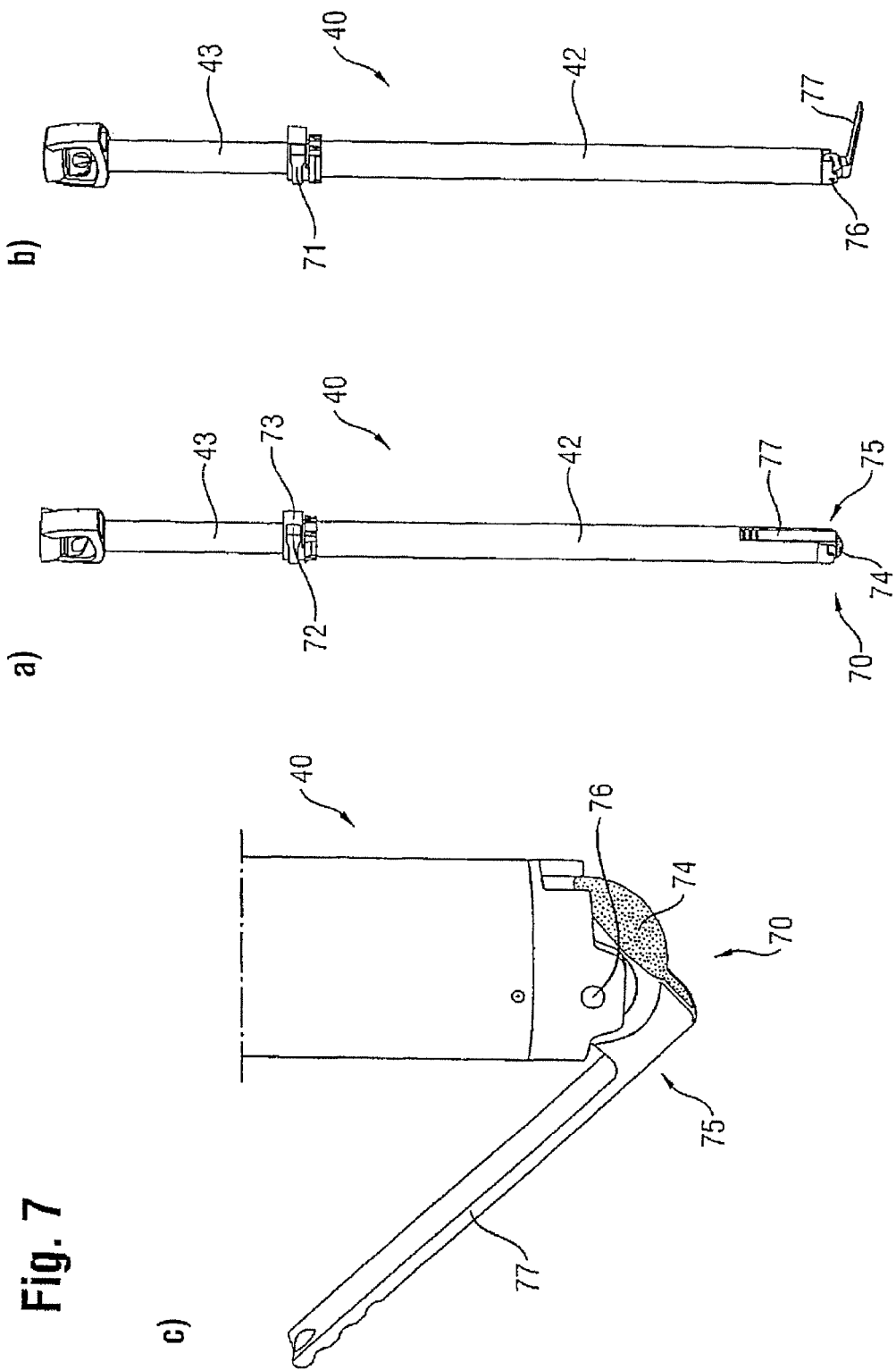

FIGS. 7*a*-7*c* shows views of a different embodiment of monopod 40, than that depicted in FIG. 1*c*. Monopod 40 of FIGS. 7*a*-7*c* employs a different clamping mechanism for locking telescopic tubes 42 and 43. As depicted, the clamping mechanism includes a lever 71 with an integrally embodied cam 72 that compresses a slotted ring 73 that in turn grips an outer circumference of inner tube 43. Ring 73 with lever 71 and cam 72 may be attached to outer tube 42. Stand head 501 may be mounted to monopod 40 using a similar configuration as fastening arrangement 50, which is shown in FIG. 8 and described above, that connects spreader device 10 and stand unit 30.

FIGS. 7*a* to 7*c* also illustrate a foot of monopod 40, in accordance with an embodiment. Monopod foot may include a rubberized section 74 that is shaped like a portion of a sphere, and that is attached to a lever 75 or a downward facing surface of the foot. Lever 75 may be pivotably mounted about a pivot axis 76 that is perpendicular to a longitudinal axis of the outer tube 42. Lever 75 may include a limb 77 that can be brought into contact with the ground or floor by pivoting lever 75 about axis 76, as shown in FIG. 7*c*. A foot may be installed on limb 77 so that lever 75 may also function as a foot support. The foot support may prevent the tube 72 from turning when an attached camera pans, allowing the monopod to fully employ camera damping advantages provided by an attached stand head (fluid head), by preventing the monopod from turning with the camera and cancelling the damping effect.

Because monopod 40 can be secured to two spatially separated clamping points located at stand unit 30 and at spreader device 10, monopod 40 may achieve increased precision in alignment between an axis of the monopod and an axis of the spreader/stand system.

It should be appreciated that, various features of individual embodiments described above may be combined with each other in any way that does not result in technical incompatibility. Different types of clamping and fixing devices may be interchanged and different configurations of feet may be employed, as the invention is not limited in this respect. For example, additional feet, such as rubber feet with a flat contact surface, may be used in conjunction with the combined foot and locking elements of spreader device 10 shown in FIG. 4.

Embodiments of the modular system and spreader device may allow flexible and fast configuration of a stand system without requiring a large number of pieces of equipment. Such a stand system may be beneficially employed in various fields that include, but are limited to: news reporting, filming extreme sports, filming documentaries and wedding videos.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A set comprising:
a main stand comprising:
three support legs, and
a main stand locking element of a locking device mounted on each of the three support legs;
a mid-level spreader comprising:
a main body having a fastening arrangement constructed and arranged to detachably accommodate a stand head,
three arms coupled to the main body, each arm is mounted with a first arm end in an articulated manner to the main body,
a mid-level spreader locking element of the locking device mounted on each arm, the mid-level spreader locking element cooperating with the main stand locking element of the locking device on a respective leg of the main stand, the main stand locking element of the locking device and the mid-level spreader locking element of the locking device cooperating to detachably connect each arm for detachable connection to a corresponding support leg of the main stand,
wherein the three arms are adapted to spread the support legs of the main stand when the main stand locking element and the mid-level spreader locking element are connected and the mid-level spreader is used in combination with the main stand, and wherein the three arms are adapted to allow the mid-level spreader to stand up when the main stand locking element and the mid-level spreader locking element are detached and the mid-level spreader is used independent of the main stand,
wherein the fastening arrangement of the main body accommodates the stand head when the mid-level spreader is used independent of the main stand; and
a handle corresponding to each arm, each handle configured to unlock the main stand locking element and the mid-level spreader locking element to detach the arms of the mid-level spreader from the main stand.

2. The set according to claim 1, in which the arms each comprise feet at their second end.

3. The set according to claim 2, wherein each of the feet comprises a rubberized spike.

4. The set according to claim 3, wherein each of the feet comprises a tip, the rubberized spike being disposed on the tip.

5. The set according to claim 1, wherein each of the main stand locking element and the mid-level spreader locking element comprise a hollow cylinder, wherein the main stand locking element and the mid-level spreader locking element cooperate so that a locking pin can be introduced through the hollow cylinders in order to fix the respective arm and the respective support leg.

6. The set according to claim 5, wherein one of the hollow cylinder of the main stand locking element or the hollow cylinder of the mid-level spreader locking element comprises two co-axial portions defining a recess therebetween, wherein a shoulder is formed on a faces of each portion of the two co-axial portions facing the recess.

7. The set according to claim 6, wherein the other of the hollow cylinder of the main stand locking element or the hollow cylinder of the mid-level spreader locking element extends through the foot and includes collars, each shoulder engages a collar.

8. The set according to claim 1, in which the main body of the mid-level spreader comprises a central continuous accommodating hole for a monopod.

9. The set according to claim 8, wherein the mid-level spreader further comprises a clamping device for the detachable locking of the monopod.

10. The set according to claim 8, wherein the monopod is introduced through an opening in a coupling piece of the main stand to which the three legs are coupled, and into the accommodating hole of the mid-level spreader.

11. The set according to claim 10, in which the monopod is a telescope tube.

12. The set according to claim 10, in which the coupling piece of the main stand comprises a main stand clamping device for fixing the monopod.

13. The set according to claim 12, in which the main stand clamping device, in the locking position, presses on an outside surface of the monopod.

14. The set according to claim 1, in which the arms are as telescopically lockable.

15. The set according to claim 14, in which the arms are each constructed from a first stage comprising two limbs extending in parallel, which are connected by a guide element, and a second stage of at least one limb which is guided and held in the guide element.

16. The set according to claim 15, in which a clamping device for clamping the second stage is provided in the guide element.

17. The set according to claim 16, in which the clamping device for clamping the second stage is formed by a cam actuatable via a handle, which in the locking position presses on an outside surface of the at least one limb.

18. The set according to claim 16, in which the clamping device for clamping the second stage is formed by a screw provided with a handle which in the locking position presses on an outside surface of the at least one limb.

19. The set according to claim 15, in which an end of the limb of the second stage facing the first stage is supported on both sides on inner sides of the parallel limbs of the first stage.

20. The set according to claim 1, in which the main stand legs are telescopic.

21. The set according to claim 1, wherein the handle moves axially in a direction perpendicular to a longitudinal extension of the arm to unlock the first and second locking elements.

22. A set comprising:
a main stand comprising:
three support legs, and
a main stand locking element of a locking device mounted on each of the three support legs; and
a spreader device comprising:
a main body having a fastening arrangement configured to detachably engage a stand head;
arms coupled to the main body, each arm configured to detachably and rotatably couple with each corresponding support leg of the main stand, the arms configured to support the spreader device when the spreader device is detached from the main stand and the spreader device is used independent of the main stand, and the arms configured to spread the support legs of the main stand when the spreader device is used in combination with the main stand, wherein the arms are telescopically lockable, and wherein the arms are each constructed from a first stage comprising two limbs extending in parallel, which are connected by a guide element and a second stage of at least one limb which is guided and held in the guide element, wherein an end of the second stage has a spreader device locking element of the locking device connected to the main stand locking element of a corresponding support leg of the main stand when the spreader device is used in combination with the main stand, the spreader device locking element of the locking device including a cylindrical channel that extends therethrough; and a foot attached to each arm, each foot configured to contact a support surface when the main stand locking element and the spreader device locking element are detached from each other and the spreader device is detached from the main stand and the spreader device is used independent of the main stand, wherein the foot comprises the spreader device locking element of the locking device.

23. A set comprising:

a main stand comprising:

three support legs, and a main stand locking element of a locking device mounted on each of the three support legs; and a mid-level spreader comprising:

a main body having a fastening arrangement constructed and arranged to detachably accommodate a stand head, three arms coupled to the main body, each arm is mounted with a first arm end in an articulated manner to the main body, a mid-level spreader locking element of the locking device mounted on each arm, the mid-level spreader locking element cooperating with the main stand locking element of the locking device on a respective leg of the main stand, the main stand locking element of the locking device and the mid-level spreader locking element of the locking device cooperating to detachably connect each arm to a corresponding support leg of the main stand, wherein the three arms are adapted to spread the support legs of the main stand when the main stand locking element and the mid-level spreader locking element are connected and the mid-level spreader is used in combination with the main stand, and wherein the three arms are adapted to allow the mid-level spreader to stand up when the main stand locking element and the mid-level spreader locking element are detached and the mid-level spreader is used independent of the main stand, wherein the fastening arrangement of the main body accommodates the stand head when the mid-level spreader is used independent of the main stand, and a foot positioned at second ends of each of the arms, wherein at least a portion of each foot extends downwardly from the mid-level spreader locking element of the locking device, and wherein each mid-level spreader locking element extends through the corresponding foot, and wherein each foot is constructed and arranged to contact a support surface when the mid-level spreader is detached from the main stand and is used independent of the main stand.

24. A set comprising:

a main stand comprising:

three support legs, and a main stand locking element of a locking device mounted on each of the three support legs;

a mid-level spreader comprising:

a main body having an accommodating hole constructed and arranged to receive a stand head there through, the main body having a fastening arrangement constructed and arranged to detachably fasten the stand head, three arms coupled to the main body, each arm is mounted with a first arm end in an articulated manner to the main body, a mid-level spreader locking element of the locking device mounted on each arm, the mid-level spreader locking element cooperating with the main stand locking element of the locking device on a respective leg of the main stand, the main stand locking element of the locking device and the mid-level spreader locking element of the locking device cooperating to detachably connect each arm to a corresponding support leg of the main stand, wherein the three arms are adapted to spread the support legs of the main stand when the main body locking element and the mid-level spreader locking element are connected and the mid-level spreader is used in combination with the main stand, and wherein the three arms are adapted to allow the mid-level spreader to stand up when the main body locking element and the mid-level spreader locking element are detached and the mid-level spreader is used independent of the main stand, wherein the main body is adapted to accommodate a stand head when the mid-level spreader is used independent of the main stand; and a handle corresponding to each arm, each handle configured to unlock the main body locking element and the mid-level spreader locking element to detach the arms of the mid-level spreader from the main stand.

* * * * *

UNITED STATES PATENT AND TRADEMARK OFFICE
CERTIFICATE OF CORRECTION

PATENT NO. : 8,534,620 B2
APPLICATION NO. : 12/205812
DATED : September 17, 2013
INVENTOR(S) : Robert Zierer et al.

It is certified that error appears in the above-identified patent and that said Letters Patent is hereby corrected as shown below:

In the claims:

At column 13, claim 6, line 64, delete "faces" and insert --face--.

Signed and Sealed this
Twenty-fourth Day of December, 2013

Margaret A. Focarino
*Commissioner for Patents of the United States Patent and Trademark Office*